United States Patent [19]

Loeffler, Jr.

[11] 4,193,858

[45] Mar. 18, 1980

[54] STACK PACK ELECTROLYTIC CELL

[75] Inventor: J. Edward Loeffler, Jr., Kirtland, Ohio

[73] Assignee: Diamond Shamrock Corporation, Dallas, Tex.

[21] Appl. No.: 957,324

[22] Filed: Nov. 3, 1978

[51] Int. Cl.$^2$ .................. C25B 9/04; C25B 11/03; C25B 11/00
[52] U.S. Cl. .................. 204/268; 204/270; 204/284; 204/290 R
[58] Field of Search ............. 204/267, 268, 269, 270, 204/284, 288, 289, 290 R, 95

[56] References Cited

U.S. PATENT DOCUMENTS

| | | | |
|---|---|---|---|
| 3,119,760 | 1/1964 | Foreman et al. | 204/269 |
| 3,819,504 | 6/1974 | Bennett | 204/289 |
| 4,124,480 | 11/1978 | Stevenson | 204/268 |
| 4,134,805 | 1/1979 | Fröhler et al. | 204/269 X |

FOREIGN PATENT DOCUMENTS 429020 10/1974 U.S.S.R. .................. 204/269

Primary Examiner—John H. Mack
Assistant Examiner—D. R. Valentine
Attorney, Agent, or Firm—Bruce M. Winchell

[57] ABSTRACT

Disclosed is a stack pack type electrolytic cell for the generation of chlorates or hypochlorites of sodium or potassium having the ability to make economical use of materials while eliminating the necessity for large external studs for the electrode components, housings to retain fluids and intercell piping connections since the cell can be increased in capacity by adding chambers and electrode stack packs to the cell makeup or adding electrodes to the stack packs. Such an electrolyzer can utilize mass produced components to produce various capacities and can be assembled either monopolar or bipolar in configuration to make most efficient use of existing electrical supply equipment.

9 Claims, 6 Drawing Figures

STACK PACK ELECTROLYTIC CELL

BACKGROUND OF THE INVENTION

The present invention relates generally to a stack pack construction of an electrolytic cell for the generation of chlorates or hypochlorites of sodium or potassium utilizing repeatable components which are mass produced to build electrolytic cells having various capacities in addition to having either monopolar or bipolar configurations for efficient use of existing electrical supply equipment. More particularly, the present invention relates to an improved stack pack type electrolytic cell for the production of sodium hypochlorite having repeatable enclosure and electrode stack pack components which can be mass produced in the most efficient manner to build electrolytic cells of varying capacities and varying electrode configurations. This employs the use of two end plates with structural cross members which can be utilized with tie rods between two such end plates to compress the chambers and stack packs therebetween. The various chambers which are utilized between these two end plates can be mass produced by injection molding or other plastic molding operations to provide a very uniform workpiece for the assembly of various sized electrolytic cells.

Active chlorine in the form of sodium hypochlorite has been used for some time as a biocidally active agent for treatment of sewage, liquid effluents, water in swimming pools, cooling tower waters, or drinking water. Generally, such treatment is affected by the use of rather large volumes of chemical compounds each as sodium hypochlorite or molecular chlorine, if available. The addition of such chemical compounds to affect the biocidal activity desired has become costly and is likely that greater restrictions upon the traffic of dangerous chemical products in the transportation networks of the world will necessitate on-site manufacture of such compounds or a different means by which treatment may be carried out. For some time now, it has been known that electrochemical methods of manufacture present one solution to this problem due to their capability for small on-site production at a reasonable cost; greater ecological acceptability, and potential for energy conservation. Furthermore, electrochemical methods of manufacture can generally be operated as closed systems thereby allowing greater control over the escape of biproducts or waste products from the electrolytic cells which may have been environmentally undesirable. Electrolytic cells promise to be one of the most efficient means of utilizing electricity which is likely to be used more in the future due to the rapidly rising costs and expected exhaustion of fossil fuels such as coal, gas, and oil.

Where there are readily available supplies of saltwater (brine) such as seawater, aqueous solutions of hypochlorite solution can be readily made by electrolysis of seawater. The problem has been that with specified capacities of such seawater electrolytic cells, storage of product compound is often necessitated by the uneven usage of drinking water or uneven production of sewage for treatment. Thus, one of the problems of use of electrolytic cell is the sizing of such a cell to the given capacity needs of each individual treatment plant in order to best conserve the need for massive storage facilities which cause numerous problems. Very often in the past, an electrolytic cell having a small capacity was designed and build such that several such units could be ganged together to provide the given capacity necessary for any given operation. This, however, involves inefficiencies of the use of materials such as electrode components in chambers and additional piping necessary for such cells to the extent where costs can rapidly exceed economical commercial realization of the full potential of such an electrolytic chlorine generation system because of the number of units associated equipment therewith, especially for large volume operations.

Therefore, it would be exceedingly advantageous to develop an electrolytic cell system for the generation of hypochlorite utilizing a brine solution that can be adequately sized for various production capacities and, in accordance with existing electrical supply equipment to thereby reduce substantially the cost for the use of such cells in the production of water treatment compounds.

SUMMARY OF THE INVENTION

It is, therefore, an object of the present invention to provide a stack pack electrolytic cell for the generation of hypochlorite which can be built to varying capacities from mass produced components in either bipolar or monopolar configuration so as to provide the most economical cell construction for the generation of a given capacity of hypochlorite.

These and other objects of the present invention, together with the advantages thereof over existing and prior art forms which will become apparent to those skilled in the art from the detailed disclosure of the present invention as set forth herein below, are accomplished by the improvements herein shown, described and claimed.

It has been found that a stack pack electrolytic cell for the production of chlorates or of hypochlorites can consist of: two end plates having a plurality of structural cross members overhanging each edge of said end plates for tying and compressing internal units therebetween in liquid tight configuration; tie rods for extending and connecting the overextended edges of said structural cross members in order to compress the components between said end plates; two or more chamber sections in sealing engagement between said end plates; at least one electrode stack pack; said electrode stack pack containing at least one foraminous anode with an electrocatalytically active coating thereon and a number of cathodes equal to the number of foraminous anodes plus one; said cathodes made of metallic sheet having apertures therein so as to provide electrolyte flow throughout said electrode stack pack; said cathodes acting as separators between said electrode stack packs to insure proper flow for cleaning the electrolytic cell of deposits; at least one access port for the removal of hydrogen gas from the electrolytic cell; and means for providing a direct electrical current between said anodes and said cathodes for the production of chlorates or hypochlorites.

The preferred embodiment of the subject stack pack electrolytic cell for the production of sodium hypochlorite is shown by way of example in the accompanying drawings without attempting to show all the various forms and modifications in which the invention might be embodied; the invention being measured by the appended claim, and not the details of this disclosure.

DESCRIPTION OF THE PREFERRED EMBODIMENT

Figure 2:
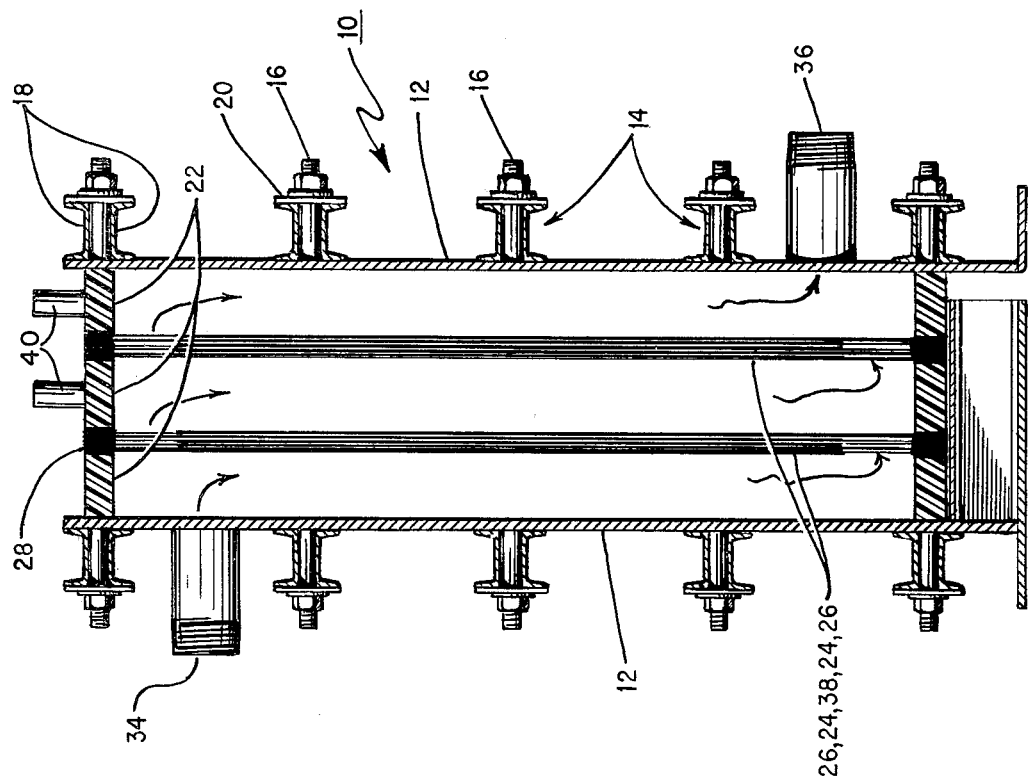
FIG. 2 is a side section view of the stack pack electrolytic cell taken substantially along line 2—2 of FIG. 1.

Referring to the figures of the drawings, numeral 10 generally refers to a stack pack electrolytic cell according to the concepts of the present invention. Such a cell 10 as amply seen in FIG. 1 of the drawings has an enclosure made up of two end plates 12 which have overextending structural cross members 14 utilized with tie rods 16 to provide the clamping force to provide a closed cellular structure for the cell 10. The end plates 12 must be made of a suitable material to resist the caustic surroundings of the interior of the electrolytic cell. Generally acceptable materials include, for instance, plastics and metals such as steel. The cross members 14 provide the structural integrity for the electrolytic cell 10 and thus must be made of sufficiently mechanically strong material as to resist bending and warpage. A preferred material is steel. As can be amply seen in FIG. 2, it is convenient to build the cross members 14 out of two pieces each of steel channel 18 welded with smooth faces toward each other to provide a space to journal the tie rods 16 therethrough. Furthermore, to tie the ends of cross members 14 together and to provide a particularly suitable opening for the tie rod 16 will generally be a flat plate 20 welded to the two pieces of channel iron to provide a flat, smooth surface on which to provide the bearing surface for the tie rods 16 to assemble an electrolytic cell 10. By the construction of such a structure, it is convenient for tie rods 16 of varying lengths to be utilized so as to build cells 10 of varying capacities while providing adequate and smooth bearing surfaces 20 for the compression of the various components to build the electrolytic cell 10. Such a cell 10 in assembled condition can be amply seen in FIG. 2 and is capable of mass production, since the exact same design of end plate 12 will be utilized for all cells of this general nature to build stack pack electrolytic cells 10 according to varying capacities necessary for production needs.

Figure 1:
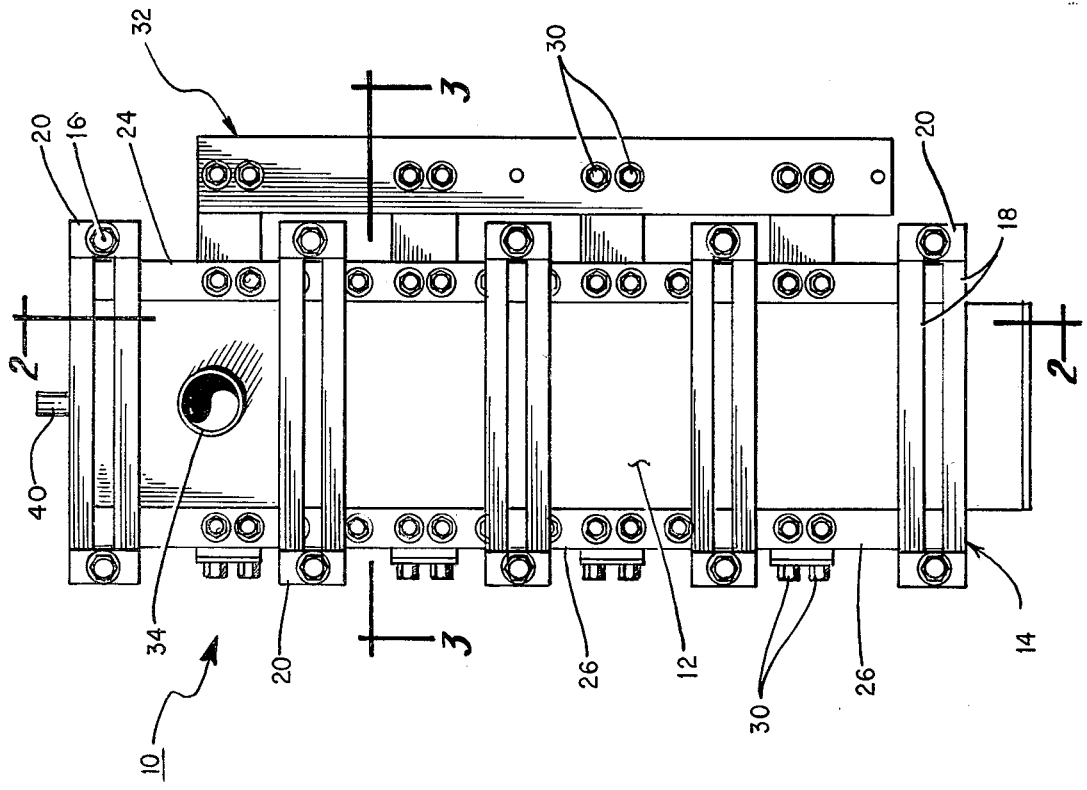
FIG. 1 is an end elevation view of a stack pack electrolytic cell for the production of chlorates or hypochlorites according to the concepts of the present invention.

Spaced between end plates 12 will be one or more chamber sections 22. As amply seen in FIG. 2 of the drawings, three such chamber sections 22 are present in the cell therein shown. However, depending upon production capacity required for the given cell, any number of chamber sections 22 might be utilized between end plates 12 utilizing extended tie rods 16 to build larger electrolytic cells 10 according to the concepts of the present invention. These chamber sections 22 are rectangular in shape similar to the end plates 12 as seen in FIG. 1 except that on some or all chamber sections 22 there will be a hydrogen release port 40 as amply seen in FIGS. 1 and 2, such as to be capable of mass production by injection molding to produce a uniform and reasonably economical chamber section 22. Therefore, it is convenient to make these chamber sections 22 out of a plastic material which is resistant to the internal corrosive surroundings of the electrolytic cell 10. However, it is not beyond the concepts of the present invention to utilize internal chamber sections 22 made of various other materials such as metals, like steel. A preferred material for chamber sections 22 based upon chemical resistivities and ease of injection molding is a polyvinyl chloride material.

Figure 3:
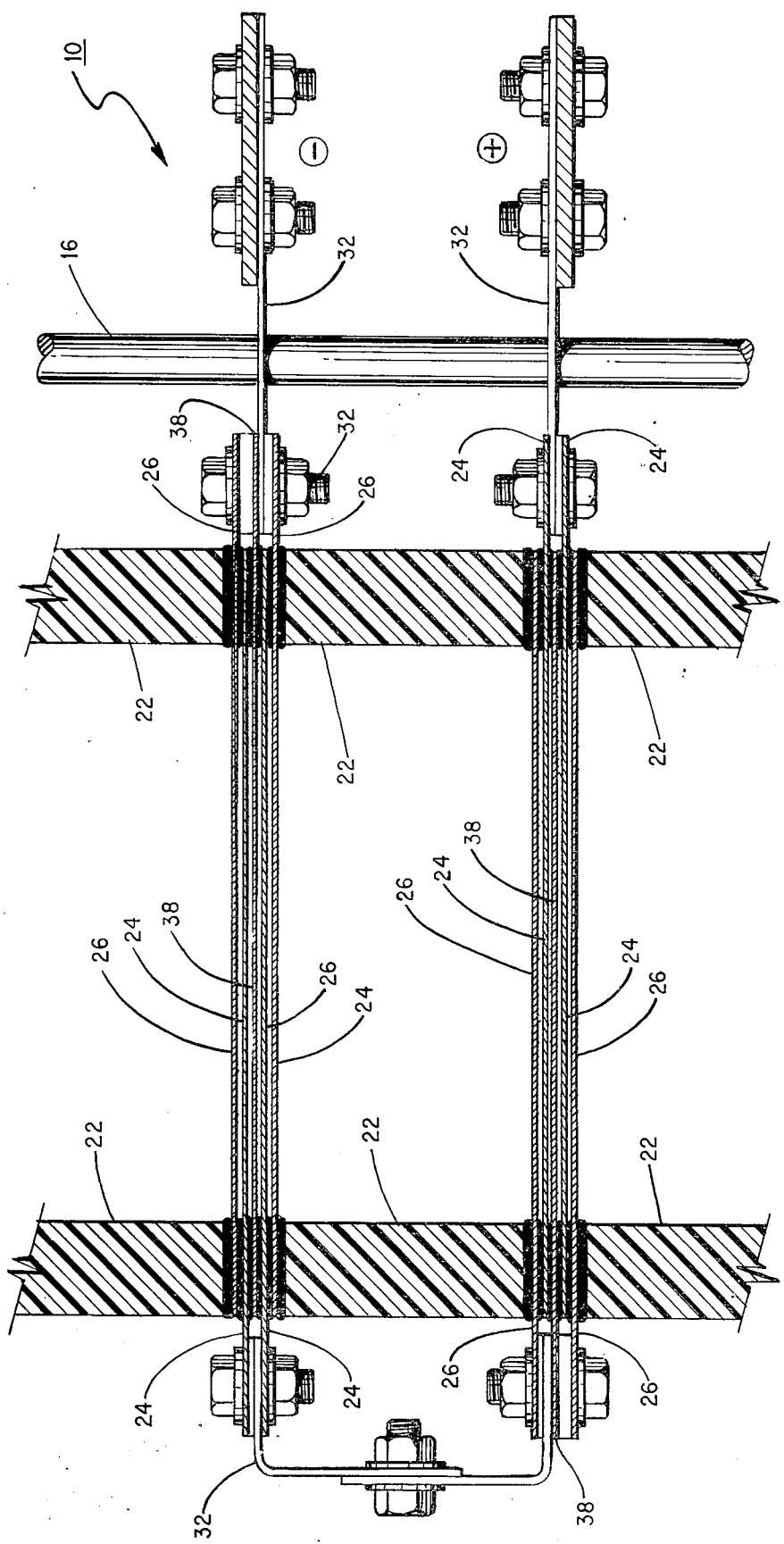
FIG. 3 is a top section view of the stack pack electrolytic cell taken substantially along line 3—3 of FIG. 1.

As can be seen in FIG. 3, interposed between each of the chamber sections 22 are several anodes 24 and cathodes 26 and 38 along with associated gasketing 28 to provide what is to be defined hereinafter as one or more electrode stack packs for the electrolytic cell 10. It should be noticed that in each case a cathode 26 is on the outside of each given stack pack of anodes 24 and cathodes 26 such that both sides of each anode 24 are utilized electrolytically for production of chlorates or hypochlorites. This makes the best possible effective utilization of expensive anode material. Furthermore, cathodes 26 utilized in this manner form the separators between the given units so as to insure the proper flow through the electrolytic cell 10 for the production of chlorates or hypochlorites. In each case the anodes 24 of a single electrode stack pack will extend beyond the boundaries of the electrolytic cell 10 in one direction, and the cathodes 26 and 38 will extend beyond the boundaries of the electrolytic cell 10 in the other direction. This is so that electrical hookup can be made utilizing bolting arrangements such as bolts 30 to assure proper electrical tie-in with the bus network 32 to an appropriate electrical power supply. Furthermore, by carefully arranging the extending edges of the anodes 24 and cathodes 26 and 38, it can be easily constructed to build either a bipolar arrangement as seen in FIG. 3 or a monopolar arrangement by having all of the anodes 24 of one electrode stack pack overextend in one direction of the cell 10 and all the cathodes 26 of the next electrode stack pack overextend in the other direction of the cell 10 for appropriate electrical connection. In FIG. 3, the anodes 24 overextend to the left on the top stack pack and the cathodes 26 and 38 overextend to the left on the bottom stack pack to provide electrical bus connection to 32 between the anodes 24 of one stack pack and the cathodes 26 and 38 of another stack pack thus constructing a bipolar configuration for this electrolytic cell 10. In this manner if existing electrical supply equipment is available, the cell can be constructed so as to best utilize that equipment by employing a bipolar configuration to attain higher voltages or a monopolar configuration to attain lower voltages.

Figure 4:
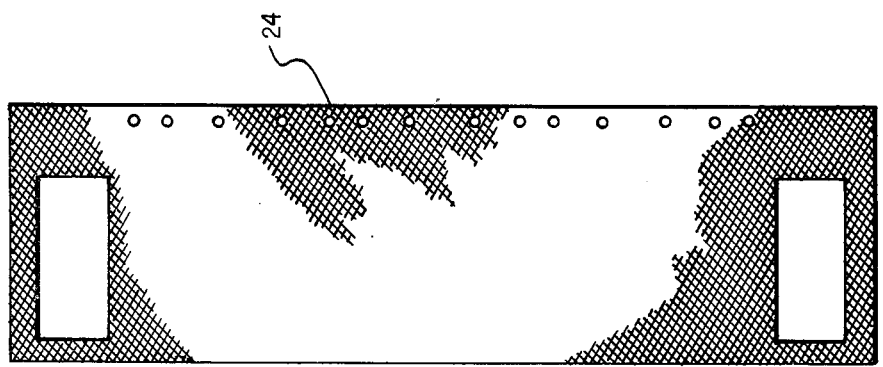
FIG. 4 is an elevation view of a typical anode to be utilized in such a stack pack electrolytic cell.

Further detail of the anodes 24 can be amply seen in FIG. 4 of the drawings showing the anodes 24 to be a foraminous or expanded metal mesh-type construction having a spaced series of apertures along one edge thereof to extend beyond the boundaries of the electrolytic cell 10 for appropriate electrical connection. It can also be seen in FIG. 1 that the appropriate electrical connection is spaced between the overextended cross members 14 as shown in FIG. 1 so as to provide no interference with the tie rods 16 connecting the sections of the electrolytic cell 10. It is contemplated in the electrolytic cell 10 according to the concepts of the present invention that the anodes 24 will be constructed of any conventional electrically conductive electrocatalytically active material resistant to the anolyte such as a valve metal like titanium or tantalum or alloys thereof, bearing on the surface a noble metal, a noble metal oxide (either alone or in combination with a valve metal oxide) or other electrocatalytically active corrosion resistant materials. Anodes of this class are called dimensionally stable anodes and are well-known and widely used in the industry today. Examples of such coatings compositions would include the Beer coatings according to the U.S. Pat. Nos. 3,711,385; 3,751,296; and 3,933,616. Further examples of appropriate coating systems would include U.S. Pat. Nos. 3,776,834; 3,855,092; 3,875,043; 3,878,083; 4,028,215; 4,040,939 all of which hereby are incorporated by reference. A preferred valve metal for the material based upon cost, availability, electrical and chemical properties is titanium. It is important, however, that the anodes be constructed of a foraminous material so as to insure easy flow through the anode 24 structure itself. It is preferred that if titanium expanded metal mesh is utilized for the anodes 24, that said mesh be flatened for ease of installation.

Gasketing material 28 is necessary to seal the cell to assure against leaks of the electrolyte material. Proper gasketing material 28 can be of any elastomeric material which will withstand the chemical surroundings of the stack pack electrolytic cell 10. A preferred gasketing material is of natural rubber having a durometer measurement of 40 which can be compressed slightly into the mesh or could be molded into the mesh. In the alternative, gasketing material 28 could be glued to the cathode plate for compression into the anode mesh. Furthermore, to maintain a given electrode gap and prevent chemical crystal buildup on the gasketing material 28 around the inactive areas, a plastic spacer ring may be placed on the internal perimeter of the gasketing material 28. A suitable substance for such a spacer would be a polyvinyl chloride material.

Figure 6:
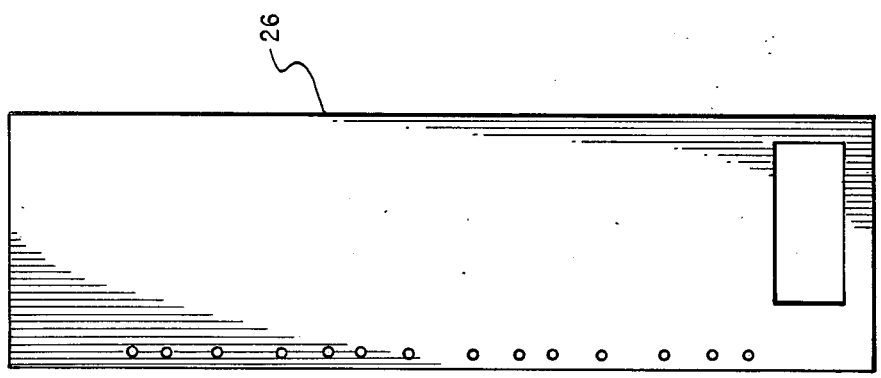
FIG. 6 is an elevation view of a typical outside cathode to be utilized in such a stack pack electrolytic cell.
Figure 5:
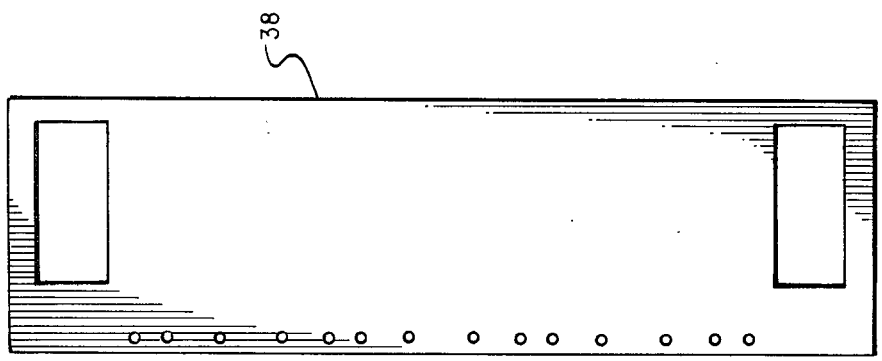
FIG. 5 is an elevation view of a typical inside cathode to be utilized in such a stack pack electrolytic cell.

As seen in FIGS. 5 and 6, the cathode 26 will be of two basic designs. The materials utilized for the construction of the cathode will generally be metal sheet material including any conventional electrically conductive material resistant to the electrolyte such as iron, mild steel, stainless steel, nickel, stainless steel clad copper, or nickel clad copper. It has been found in the present instance that cathodes 26 made of a nickel, molybdenum, and chrome alloy are preferred. Such an alloy can be purchased commercially from Cabot Corporation under the trademark of HASTELLOY C. Nickel and nickel-chrome alloys perform well also. It is important that cathodes 26 be made of sheet material since they constitute the separators to assure electrolyte flow through the electrolytic cell 10 for the production of sodium hypochlorite. As can be seen in FIG. 5, a cathode 26 to be utilized as the central cathode 38 in an electrode stack pack has apertures at either end for electrolyte flow therethrough. However, in FIG. 6, a cathode 26 to be utilized as the outermost cathodes has an aperture at one end only of the electrode to control the flow in one direction.

It is preferred that each electrode stack pack have the outside face of each outside cathode 26 covered with an electrically nonconducting material to prevent any current leakage between adjacent electrode stack packs in the electrolytic cell 10. This can be accomplished by inserting a thin plastic film over the outside of each electrode stack pack or the gasketing material 28 need only be cut out for the apertures of the cathodes 26.

Those skilled in the art will also note that each electrode stack pack must have at least one foraminous anode 24 with an electrocatalytically active coating thereon and a number of cathodes 26 equal to the number of anodes 24 plus one. If more than one anode 24 is used then there will be at least a number of central cathodes 38 equal to the number of anodes 24 minus one. The electrode stack packs themselves may contain any number of anodes and cathodes as desired for production purposes in addition to having any desired number of electrode stack packs in the electrolytic cell 10.

Thus, as seen in FIG. 2, the flow from the feed side 34 will enter at the top of the cell, travel to the bottom of chamber section 22 where it will enter the electrode stack pack through the aperture in the outer cathode 26 where it may flow up along the central cathode 38 having apertures at each end and flow out at the top of the next succeeding chamber 22 where it will again flow to the bottom and start the process over until the flow exits the cell at outlet 36. This assures a sequential flow through the entire electrode stack pack to produce the most efficient production of sodium hypochlorite. This permits the continuous cleaning of the cell through the electrolyte flow through the cell. Furthermore, it should be noted that at each of the openings in the cathodes shown in FIGS. 5 and 6, the leading edges are polished so as to avoid Eddy currents which are detrimental to the current efficiency of the electrolytic cell 10. It can also be seen in FIGS. 5 and 6 that the cathodes 26 and 38 like the anodes 24 have an overextended punched out portion for the bolts 30 and bus network 32 to connect thereto for supply of necessary electrical current.

In the operation of the cell for the production of sodium hypochlorite from seawater, the electrolyte flow is used to keep the anodes 24 and cathodes 26 and 38 clean of deposits, and, thus, it is important that the flow therethrough exceed two feet per minute to provide this cleaning action so as to result in extended lifetimes of the electrolytic cell in the production of sodium hypochlorite. It is also possible to use the electrolytic cell 10 constructed according to the principles of the present invention for the production of chlorates. For the production of chlorates or potassium hypochlorite from a pure brine feed, the flow rate will be less critical since there are fewer substances present in the brine capable of causing deposit buildup. Also, the temperature of operation for hypochlorites will generally be at about room temperature or input of seawater without heating or cooling. The temperature of operation for chlorate production is much higher, more in the range of 60° to 90° C., and the pH of the brine feed should be maintained in the range of 6.5 to 7.5. The interelectrode gap of the electrode stack packs can be smaller for chlorate production.

Thus, it should be apparent from the foregoing description of the preferred embodiment that the stack pack electrolytic cell 10 shown and described herein accomplishes the objects of the invention and solves the problems attended to such devices.

What is claimed is:

1. A stack pack electrolytic cell for the production of chlorates or hypochlorites comprising: two end plates; each of said end plates having a plurality of structural cross members overhanging each edge of said end plates for tying and compressing internal units therebetween in liquid tight configuration; tie rods for extending and connecting the overextending edges of said structural cross members in order to compress the components between said end plates; two or more chamber sections in sealing engagement between said end plates; at least one electrode stack pack; said electrode stack pack containing one outside cathode, a foraminous anode, then a central cathode, a foraminous anode and finally a second outside cathode with the anodes having electrocatalytically active coatings thereon; said cathodes made of metallic sheet having apertures therein so as to provide electrolyte flow throughout said electrode stack pack; said cathodes acting as separators between said electrode packs to insure proper flow for cleaning the electrolytic cell of deposits; at least one access port for the removal of hydrogen gas from the electrolytic cell; means for supplying electrolyte feed to the interior of the electrolytic cell; means for removing the production of chlorates or hypochlorites from the electrolytic cell; and means for providing a direct electrical current between said anodes and said cathodes for the production of chlorates or hypochlorites.

2. A stack pack electrolytic cell according to claim 1 wherein said electrode stack packs are connected in bipolar configuration.

3. A stack pack electrolytic cell according to claim 1 wherein said electrode stack packs are connected in monopolar configuration.

4. A stack pack electrolytic cell according to claim 1 wherein each of said anodes and cathodes extend beyond the boundaries of said internal chamber sections for convenient electrical connection to said direct electrical current.

5. A stack pack electrolytic cell according to claim 1 wherein the liquid tight configuration is accomplished by compressive forces of said tie rods between said end plate structural cross members upon gasketing material placed between each component of the stack pack electrolytic cell.

6. A stack pack electrolytic cell according to claim 1 wherein said outside cathodes have one aperture at an end of said cathodes.

7. A stack pack electrolytic cell according to claim 6 wherein said central cathode has two apertures, one at each end of said cathode.

8. A stack pack electrolytic cell according to claim 7 wherein the leading edges of said cathodes apertures are polished.

9. A stack pack electrolytic cell according to claim 1 wherein the outside face of each electrode stack pack is covered with an electrically nonconducting material to prevent any current leakage between adjacent electrode stack packs.

* * * * *